United States Patent
Maemoto et al.

(10) Patent No.: US 9,321,413 B2
(45) Date of Patent: Apr. 26, 2016

(54) HARNESS ARRANGEMENT STRUCTURE OF VEHICLE

(71) Applicant: MAZDA MOTOR CORPORATION, Hiroshima (JP)

(72) Inventors: Toshifumi Maemoto, Hiroshima (JP); Yoshiaki Anan, Hiroshima (JP); Takeshi Murai, Hatsukaichi (JP); Hiroki Sato, Hiroshima (JP); Takeshi Matsukawa, Hiroshima (JP); Takamasa Suetomi, Hiroshima (JP); Kenji Kamijo, Hiroshima (JP); Nobuhide Seo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 404 days.

(21) Appl. No.: 13/887,037

(22) Filed: May 3, 2013

(65) Prior Publication Data
US 2013/0307328 A1 Nov. 21, 2013

(30) Foreign Application Priority Data

May 18, 2012 (JP) ................................. 2012-114652

(51) Int. Cl.
*B60L 1/00* (2006.01)
*B60R 16/02* (2006.01)

(52) U.S. Cl.
CPC .................................. *B60R 16/0215* (2013.01)

(58) Field of Classification Search
CPC ................................................. B60R 16/0215
USPC ........................................................ 307/10.1
See application file for complete search history.

(56) References Cited

U.S. PATENT DOCUMENTS

| | | | |
|---|---|---|---|
| 2001/0013725 A1* | 8/2001 | Mizuguchi | .......... B60R 16/0207 307/10.1 |
| 2006/0076833 A1 | 4/2006 | Kojima | |
| 2011/0062798 A1 | 3/2011 | Tarchinski et al. | |
| 2011/0088944 A1 | 4/2011 | Ogue et al. | |
| 2012/0248867 A1* | 10/2012 | Yoshida | ................. B60H 1/246 307/9.1 |
| 2013/0092434 A1* | 4/2013 | Kato | ................... B60R 16/0215 174/72 A |

FOREIGN PATENT DOCUMENTS

| | | |
|---|---|---|
| DE | 10 2010 045 181 A1 | 5/2011 |
| DE | 10 2012 208 680 A1 | 11/2013 |
| JP | 2000-289543 A | 10/2000 |
| JP | 2006-103629 A | 4/2006 |

OTHER PUBLICATIONS

An Office Action issued by the German Patent Office on Jun. 15, 2015, which corresponds to German Patent Application No. 10 2013 008 553.5 and is related to U.S. Appl. No. 13/887,037; with English language translation.

* cited by examiner

*Primary Examiner* — Jared Fureman
*Assistant Examiner* — Duc M Pham
(74) *Attorney, Agent, or Firm* — Studebaker & Brackett PC

(57) ABSTRACT

A feeder circuit for a main relay to control ON of OFF of an electric supply from a high-voltage battery is constituted at least by a first harness, the main relay, a second harness and switch means which are connected in series from a plus-terminal side of a low-voltage battery to a vehicle-body ground side. The first harness and the second harness are arranged to be adjacent to each other in a specified range having a specified length so that both thereof in the above-described specified range are damaged in a vehicle collision or the like.

16 Claims, 5 Drawing Sheets

HARNESS ARRANGEMENT STRUCTURE OF VEHICLE

BACKGROUND OF THE INVENTION

The present invention relates to a harness arrangement structure of a vehicle.

Hybrid vehicles or electric automotive vehicles, which are equipped with a motor for driving vehicle, have been recently popular. In this case, a high-voltage battery is installed in addition to a normal low-voltage battery. An electric supply from the high-voltage battery to the motor is controlled by a main relay, and this main relay (its relay coil) is activated by the low-voltage battery as an electric source.

A switch means is provided in a feeder circuit for the main relay in order to cut the electric supply from the high-voltage battery to the motor by making the main relay OFF when an abnormal situation, such as a vehicle collision, happens. This switch means is generally comprised of a semiconductor element (switching transistor), and a p-type of semiconductor element has been used popularly. More specifically, the above-described switch means is provided between the main relay and the low-voltage battery in the circuit. US Patent Application Publication No. 2011/0088944 A1 discloses a protection structure of a harness connecting a high-voltage battery to an inverter which is arranged below a floor panel. This publication, however, discloses nothing, in particular, about cutting or electrically grounding of a feeder circuit for the main relay.

Meanwhile, it may be considered that the switch means which is provided to make the main relay OFF is disposed between the main relay and the vehicle-body ground. It may be considered that an n-type of semiconductor element which is advantageous in costs, stability and the like is used as the switch means. In this case, the feeder circuit for the main relay is constituted at least by the first harness, the main relay, the second harness and the switch means which are connected in series from the low-voltage battery to the vehicle-body ground side.

Herein, there may occur a case in which the above-described second harness is damaged (or cut in a radical case) in the vehicle collision or the like. Especially, since the main relay is generally arranged outside the vehicle similarly to the high-voltage battery, part of the second harness is located outside the vehicle. Accordingly, there is a possibility that the second harness may be damaged.

In the case in which the switch means is provided on the vehicle-body ground side from the main relay as described above, when the second harness is merely damaged simply, the electric supply to the main relay is cut by opening the switch means (OFF), so that the electric supply from the high-voltage battery is cut. However, when the second harness is damaged and electrically grounded to a vehicle body, the main relay keeps its electric supply state even if the switch means is opened, so that the electric supply from the high-voltage battery may not be cut.

SUMMARY OF THE INVENTION

The present invention has been devised in view of the above-described matters, and an object of the present invention is to provide a harness arrangement structure of a vehicle which can make the main relay OFF surely in the case in which the switch means is provided between the main relay and the vehicle-body ground side.

According to the present invention, there is provided a harness arrangement structure of a vehicle which is equipped with a motor to drive the vehicle, a high-voltage battery to supply electricity to the motor, a low-voltage battery, a main relay to be activated by the low-voltage battery for controlling ON or OFF of an electric supply from the high-voltage battery, and a control unit to be activated by the low-voltage battery which includes a switch means to open or close of an feeder circuit for the main relay, the harness arrangement structure comprising a first harness connecting the small-voltage battery to the main relay, and a second harness connecting the mail relay to the control unit, wherein the feeder circuit for the main relay is constituted at least by the first harness, main relay, second harness and switch means which are connected in series from a plus-terminal side of the low-voltage battery to a vehicle-body ground side, and the first harness and the second harness are arranged to be adjacent to each other in a specified range having a specified length so that when the second harness in the specified range is damaged and electrically grounded to a vehicle body, the first harness in the specified range is damaged and electrically grounded to the vehicle body.

According to the present invention, even when the second harness in the above-described specified range is damaged and electrically grounded to the vehicle body, the first harness comes to be damaged at the same time (concurrently), so that the electric supply from the low-voltage battery to the main relay itself is cut. Consequently, the main relay can be made OFF surely, and thereby the electric supply from the high-voltage battery can be cut surely.

According to an embodiment of the present invention, the first harness and the second harness are arranged to be adjacent to each other continuously between the main relay and the control unit. Thereby, the first harness and the second harness are arranged to be adjacent to each other over a properly long range, so that the above-described effects of the present invention can be obtained more sufficiently.

According to another embodiment of the present invention, the first harness and the second harness are bundled in the specified range. Thereby, the above-described concurrent damage of the first harness and the second harness can be achieved surely.

According to another embodiment of the present invention, the control unit is arranged in a vehicle compartment, the low-voltage battery is arranged in an engine room, the high-voltage battery and the main relay are arranged below a floor panel constituting a floor face of the vehicle compartment, and the first harness and the second harness are arranged to be adjacent to each other outside the vehicle compartment. Thereby, respective damageable portions of the first harness and the second harness which are located outside the vehicle compartment are arranged to be adjacent to each other, so that the above-described effects of the present invention can be obtained more sufficiently.

According to another embodiment of the present invention, the first harness is arranged to extend from the low-voltage battery toward the control unit, penetrating a dash panel partitioning the vehicle compartment from the engine room, then extend from the control unit into the engine room, penetrating the dash panel again, and then extend along the dash panel toward the main relay in the engine room, the second harness is arranged to extend from the main relay along the dash panel in the engine room, and then extend toward the control unit, penetrating the dash panel, and the first harness and the second harness are arranged to be adjacent to each other along the dash panel in the engine room. Thereby, a more concrete arrangement structure can be provided, and particularly-damageable portions are arranged to be adjacent to each other, so that the above-described effects of the present invention can be obtained more sufficiently.

According to another embodiment of the present invention, the mail relay is arranged at a front end portion of a tunnel portion formed at the floor panel, and a frame member for front suspension is arranged at a position in the engine room which is located in front of the dash panel and near an area where the first harness and the second harness are arranged to be adjacent to each other along the dash panel. Thereby, the above-described effects of the present invention can be obtained more sufficiently in accordance with the damage of the second harness which may be caused by retreatment of the frame member for front suspension especially in a head-on collision of the vehicle.

According to another embodiment of the present invention, the main relay is comprised of plural relays, the switch means is comprised of plural switches, corresponding to the plural relays of the main relay, the first harness is comprised of a single harness and connected in parallel to the plural relays of the main relay, the second harness is comprised of plural harnesses, corresponding to the plural relays of the main relay, and the single harness of the first harness and the plural harnesses of the second harness are arranged to be adjacent to each other. Thereby, the present embodiment is advantageous in costs and the like because the number of the first harness is one, i.e., the minimum.

According to another embodiment of the present invention, the electricity from the high-voltage battery is supplied from the main relay to the motor via an inverter, the main relay is comprised of three relays in total, which are a relay for plus terminal and a relay for minus terminal to supply a high voltage of the high-voltage battery to the inverter, respectively, and a pre-relay incorporated into a circuit which supplies the high voltage of the high-voltage battery to the inverter in a state in which the voltage is decreased, and the second harness is comprised of three harnesses. Thereby, the voltage of the electric supply to the inverter is prevented from changing quickly and greatly, so that noises can be prevented from being generated or their sound level can be reduced.

According to another embodiment of the present invention, the switch means is comprised of an n-type of semiconductor element. Thereby, the present embodiment is advantageous in costs, stability and so on, compared with a case in which the switch means is comprised of a p-type of semiconductor element.

Other features, aspects, and advantages of the present invention will become apparent from the following description which refers to the accompanying drawings.

DETAILED DESCRIPTION OF THE INVENTION

Figure 1:
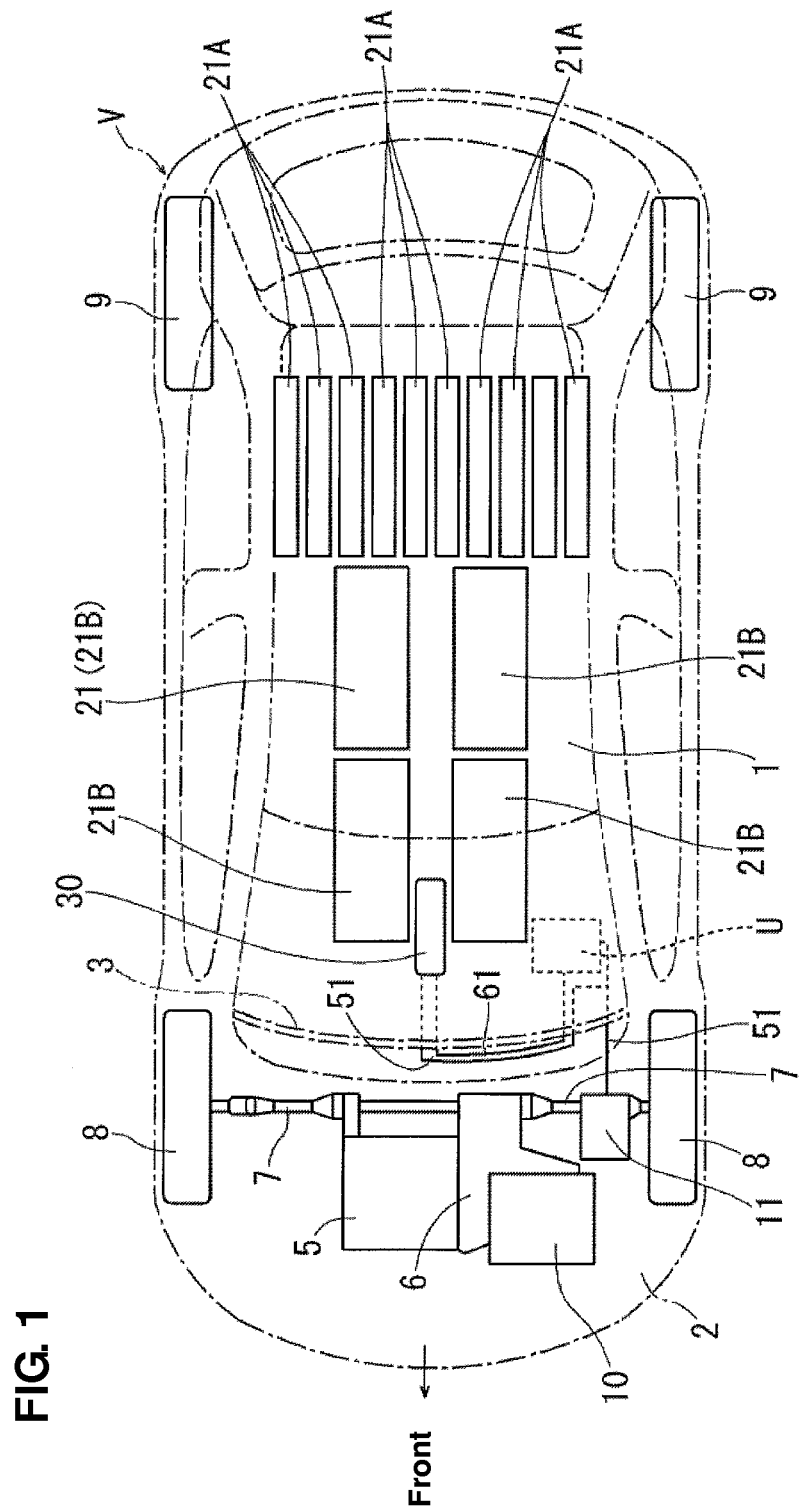
FIG. 1 is a schematic plan view showing an example of a vehicle to which the present invention is applied.

In FIG. 1, reference character V denotes a vehicle which is an electric automotive vehicle in the present embodiment. The vehicle V is schematically shown by a one-dotted broken line, and a vehicle compartment 1 is partitioned from an engine room 2 by a dash panel 3. Herein, while an engine (an internal combustion engine) is not provided because of the electric automotive vehicle, a large storage space formed in front of the vehicle compartment where a power unit and the like are stored is called "engine room" in the description according to custom.

A motor for driving vehicle 5 is arranged in the engine room 2. An output of the motor 5 is transmitted to right-and-left front wheels 8 as driving wheels via a transaxle 6, right-and-left drive axles 7, and others. Rear wheels 9 are wheels which are not driven by the motor 5. An inverter 10 and a low-voltage battery (the voltage is 12V, for example) 11 are further arranged in the engine room 2.

A high-voltage battery (the voltage is 300-400V, for example) 21 is arranged below a floor panel 13 which forms a floor face of the vehicle compartment 1. This high-voltage battery 21 is comprised of plural battery modules 21A, 21B. The battery modules 21A (ten modules in total in the present embodiment) are small sized and arranged below a rear portion of the floor panel 13. The battery modules 21B (four modules in total in the present embodiment) are large sized and arranged in front of the battery modules 12A. More specifically, the battery modules 21B are arranged along a tunnel portion 13a which is formed at a central portion, in a vehicle width direction, of the floor panel 13 and extends longitudinally. Below the floor panel 13 is arranged a main relay 30 to cut an electric supply from the high-voltage battery 21. This main relay 30 is arranged at a front end portion inside the tunnel portion 13a in the present embodiment.

Next, a feeder circuit for the main relay 30 will be described referring to FIG. 2. The main relay 30 is provided between the high-voltage battery 21 and the inverter 10 in the circuit, which controls ON or OFF of the electric supply from the high-voltage battery 21 to the inverter 10. The main relay 30 is comprised of three relays 31, 32, 33 in total. Relay coils of these relays 31, 32, 33 are denoted by reference character "a", and relay contacts of those are denoted by reference character "b". Of course, the respective relay contacts 31b-33b are contacts for ON/OFF of the high voltage from the high-voltage battery 21.

Figure 2:
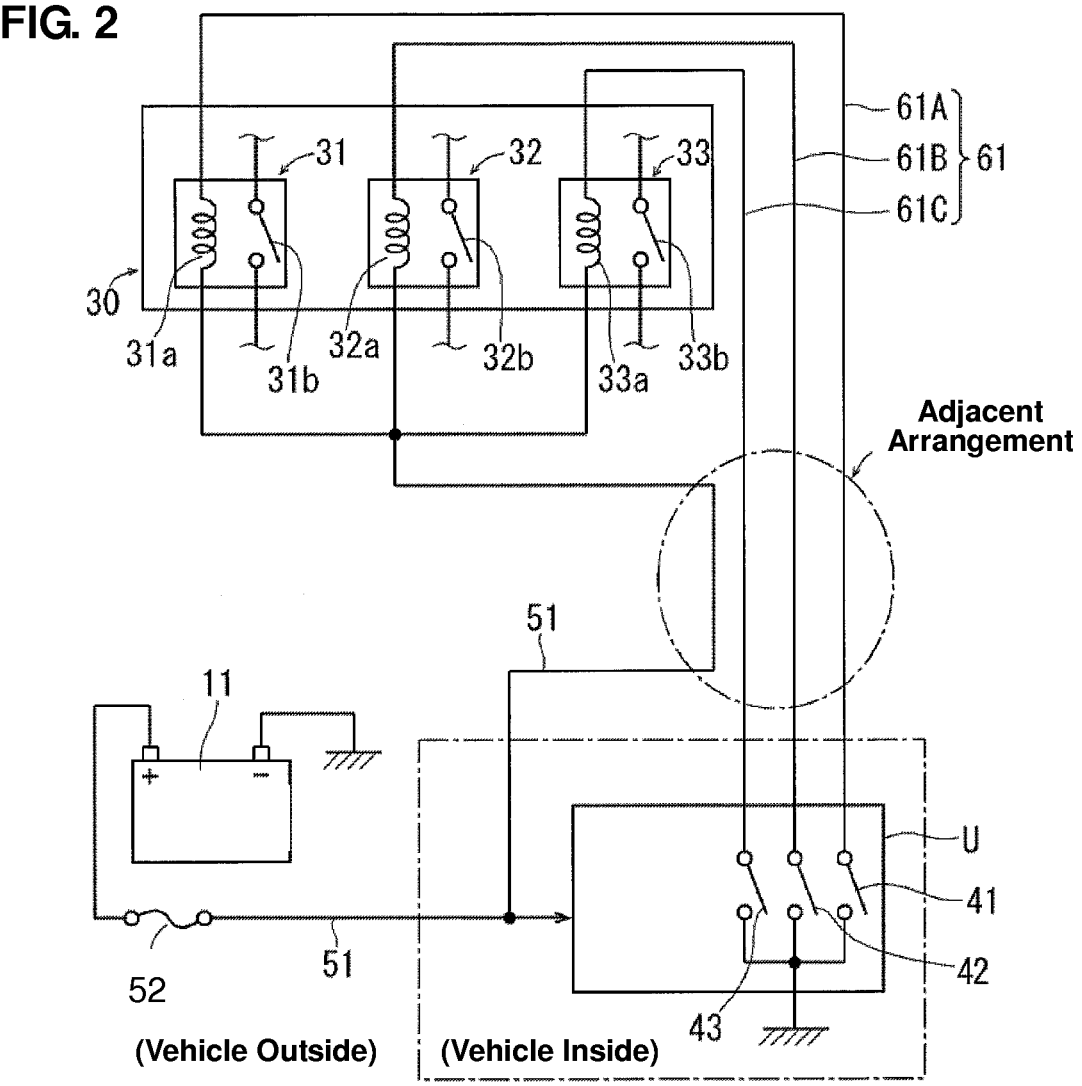
FIG. 2 is a circuit diagram showing an exemplified circuit to which the present invention is applied.

In FIG. 2, reference character U denotes a control unit to control ON or OFF of the electric supply to the main relay 30. This control unit is arranged in the vehicle compartment 1, and includes three switch means 41-43 which correspond to the three relays 31-33. The respective switch means 41-43, which are illustrated briefly, are comprised of an n-type of semiconductor element (an n-type switching transistor).

A plus terminal of the low-voltage battery 11 is connected in parallel to the respective relay coils 31a-33a via the single first harness 51. A fuse 52 is provided in the first harness 51.

The main relay 30 and the control unit U are interconnected via a second harness 61. The second harness 61 is comprised of three harnesses 61A-61C which correspond to the relays 31-33. That is, the relay coil 31a and the switch means 41 are interconnected via the second harness 61A. Likewise, the relay coil 31b and the switch means 42 are interconnected via the second harness 61B, and the relay coil 31c and the switch means 43 are interconnected via the second harness 61C. The respective switch means 41-43 are electrically grounded to a vehicle body inside the vehicle compartment.

Thus, the electric supply from the low-voltage battery 11 is configured such that the electricity flows to the vehicle body electrically grounded via the first harness 51, the mail relay 30, the second harness 61, and the switch means 41-43.

Herein, there may be a case in which the second harness 61 is damaged (is cut, for example) and contacts the vehicle body. In this case, even if the control unit U controls the switch means 41-43 in an open (OFF) state, the main relay 30 keeps its electric supply state as long as the second harness 61 is electrically grounded to the vehicle body. In order to prevent this situation, the first harness 51 is arranged to be adjacent to at least a damageable part of the second harness 61 in a specified range having a specified length. Thus, when the second harness 61 gets damaged in a vehicle collision, for example, the first harness 51 comes to be damaged at the same time (concurrently). Thereby, the feeder circuit from the low-voltage battery 11 to the main relay 30 is cut, so that the main relay 30 can be made OFF surely.

Next, a concrete arrangement example of the respective harnesses 51, 61, including an adjacent arrangement of the first harness 51 and the second harness 61, will be described referring to FIG. 3 and the subsequent figures. Herein, the second harness 61 is formed as a single harness substantially, except its connection portion to the main relay 30 and the control unit U. The control unit U is arranged near a front-left end portion of the floor panel 13 in the vehicle compartment 1 (see FIG. 4). The low-voltage battery 11 is arranged near a left-side suspension tower portion 14 in the engine room 2 (see FIG. 3).

Figure 3:
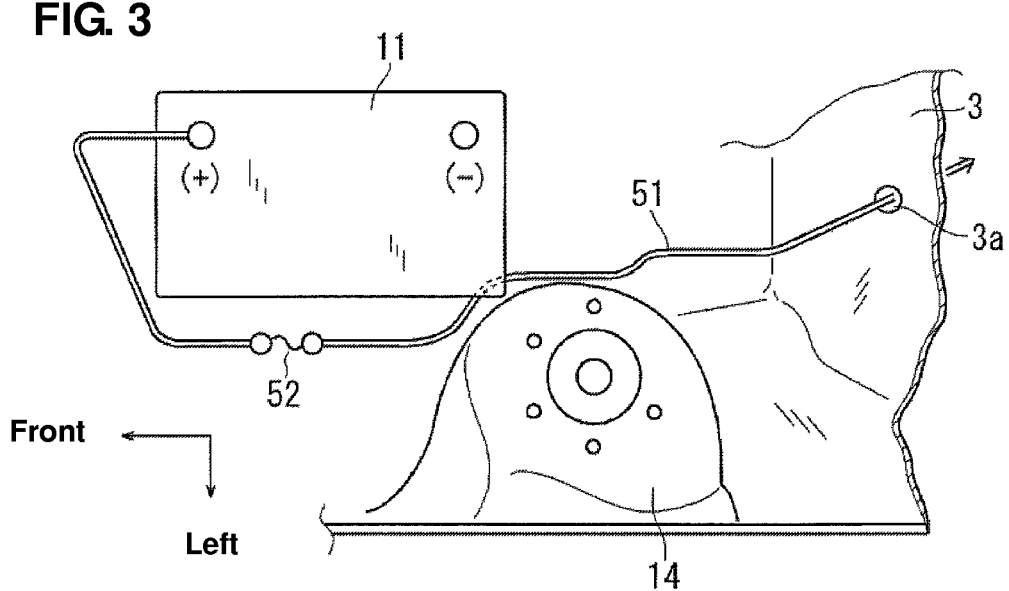
FIG. 3 is a major-part plan view showing an example of arrangement of a first harness.
Figure 4:
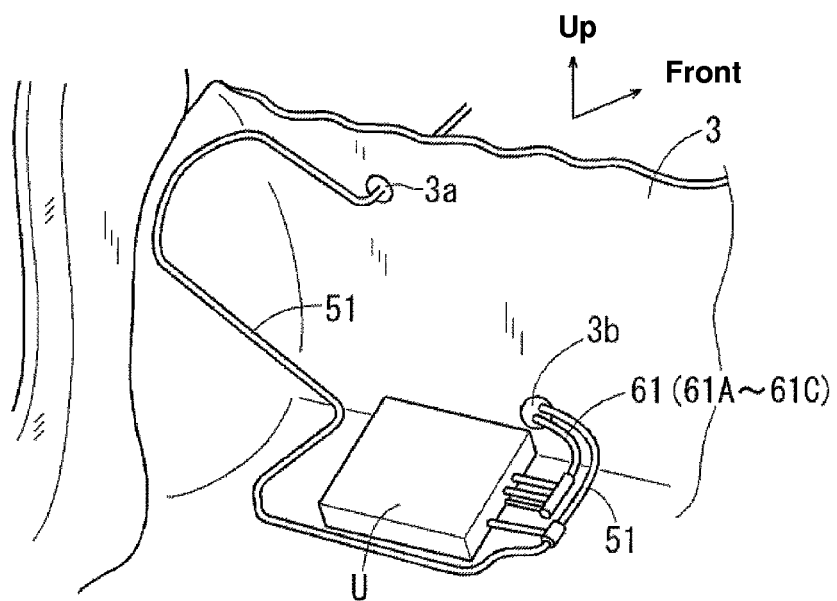
FIG. 4 is a major-part perspective view showing an example of arrangement of the first harness and an example of arrangement of a second harness.

As shown in FIG. 3, the first harness 51 extends rearward from the low-voltage battery 11, and then into the vehicle compartment 1, passing through a penetration hole 3a which is formed at a lower portion of the dash panel 3. As shown in FIG. 4, the first harness 51 located in the vehicle compartment 1 is connected to the control unit U and also extends toward the main relay 30. The first harness 51 extending toward the main relay 30 extends into the engine room 2 again, passing through a penetration hole 3b which is formed at a lower portion of the dash panel 3.

Figure 5:
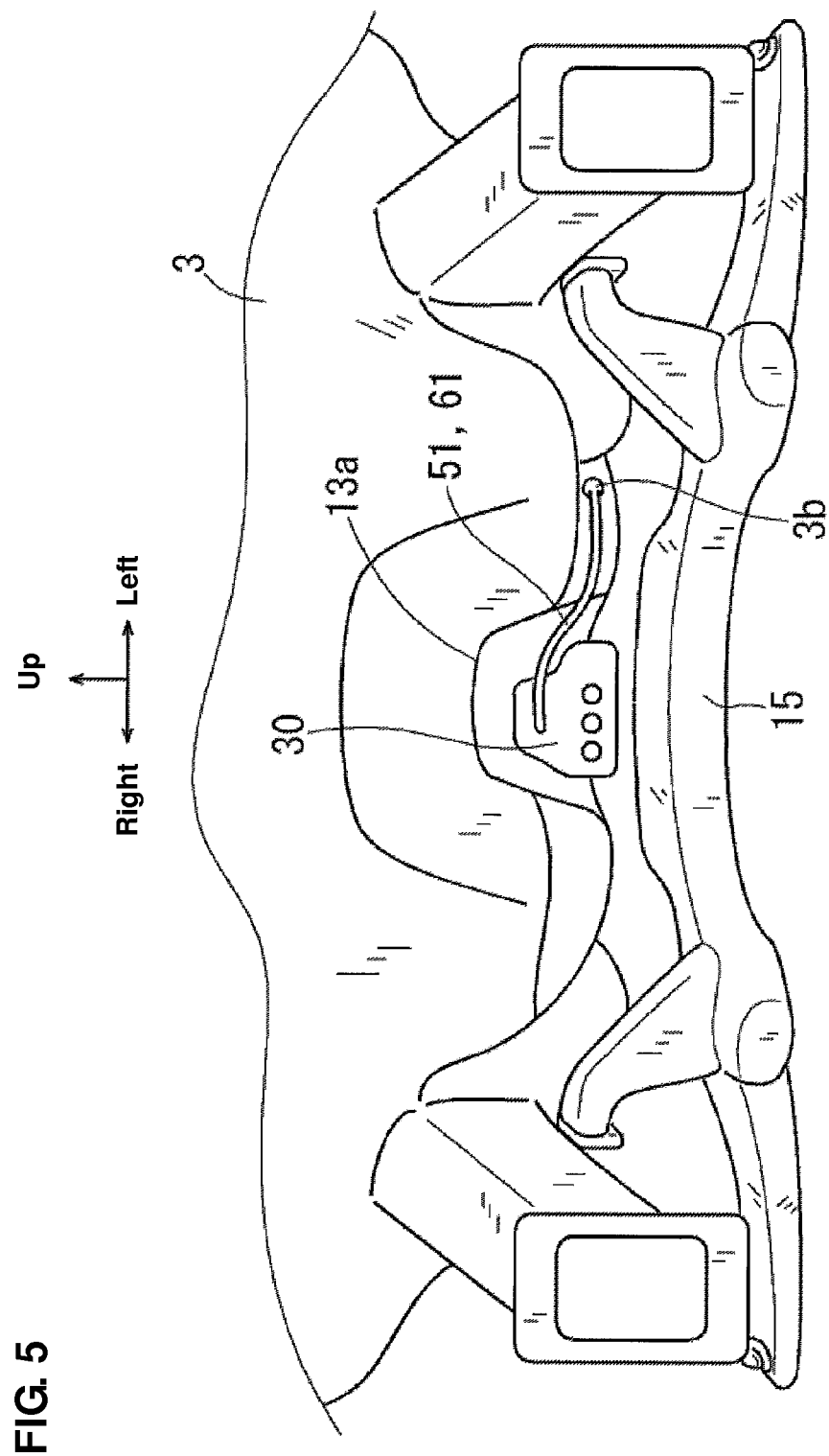
FIG. 5 is an elevational view showing an example of arrangement of a main relay and the respective harnesses, when a dash panel is viewed from the front.
Figure 6:
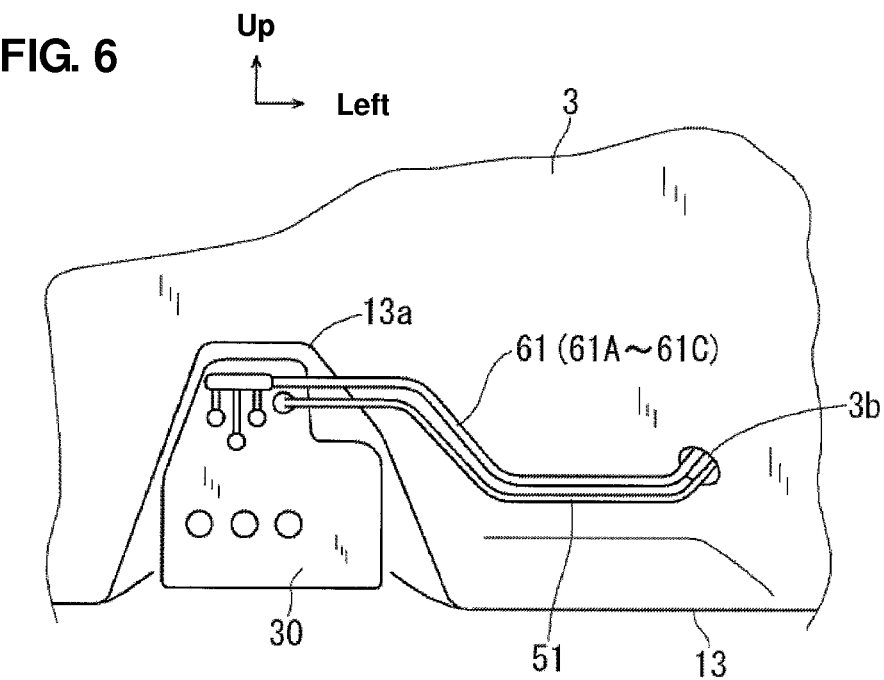
FIG. 6 is a major-part enlarged view of FIG. 5.

As shown in FIGS. 5 and 6, the first harness 51 extending into the engine room 2, passing through the penetration hole 3b, extends inward, in the vehicle width direction, along a front face of the dash panel 3, and eventually is connected to the main relay 30 (a relay box storing the main relay 30 therein) which is stored in the tunnel portion 13a formed at the floor panel 13.

Meanwhile, the second harness 61 extending from the main relay 30 extends outward, in the vehicle width direction, from the tunnel portion 13a along the front face of the dash panel 3 in a state in which the three harnesses 61A-61C are bundled, and then extends into the vehicle compartment 1, passing through the penetration hole 3b. The second harness 61 in the vehicle compartment 1 is connected to the control unit U as shown in FIG. 4.

Figure 7:
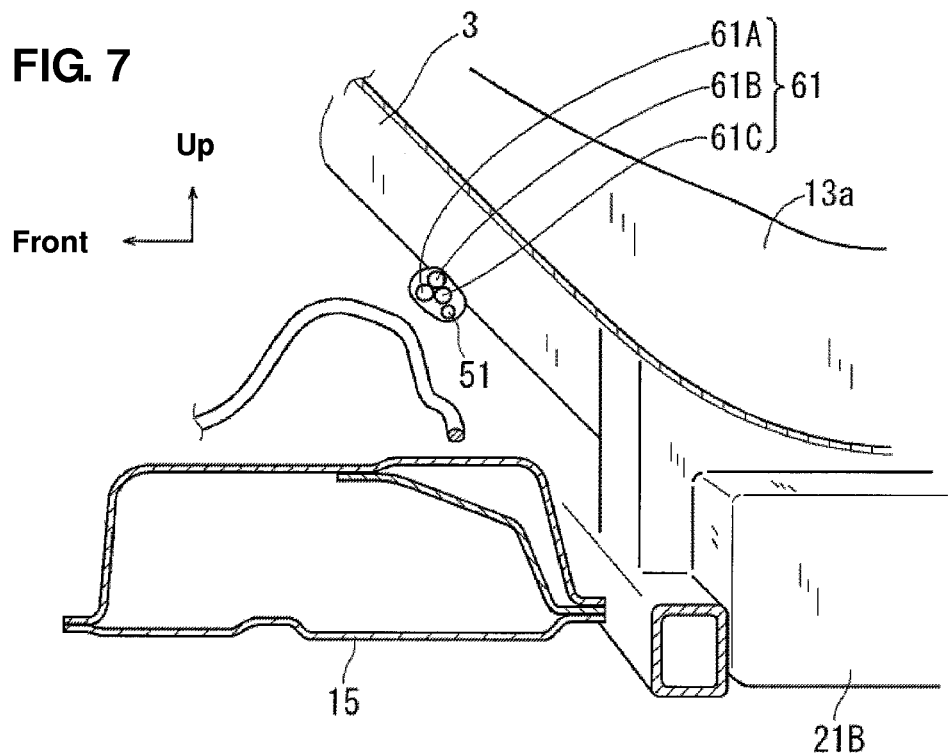
FIG. 7 is a major-part side sectional view showing positional relationships of the dash panel, a frame for front suspension, and the respective harnesses.

The first harness 51 and the second harness 61 are arranged to be adjacent to each other in a specified range having a substantially-entire length between the control unit U and the main relay 30 (see FIGS. 5-7, especially). The portions of the first harness 51 and the second harness 61 which are arranged along the front face of the dash panel 3 may be bundled or fixed to the dash panel 3 by a clip or the like.

A frame member for front suspension 15 is, as shown in FIGS. 5 and 7, arranged in the engine room 2 at a lower position which is located in front of the dash panel 3 and near an area where the first harness 51 and the second harness 61 are arranged to be adjacent to each other. When an abnormal situation, such as a vehicle collision, is detected, the control unit U controls the switch means 41-43 in the open state. Herein, in a case in which the frame member 15 retreats in a vehicle head-on collision and thereby the second harness 61 arranged along the front face of the dash panel 3 gets damaged (is cut, for example), the first harness 51 arranged adjacently to the second harness 61 comes to be damaged at the same time. Accordingly, even if the damaged second harness 61 is electrically grounded (to the vehicle body), the first harness 51 is electrically grounded at the same time, so that the electric supply from the low-voltage battery 11 to the main relay 30 is cut. Thereby, the main relay 30 can be made OFF surely, thereby cutting the electric supply from the high-voltage battery 21 surely.

Herein, it is fine that the main relay 30 is basically comprised of two relays 31, 32 which are respectively for a plus terminal and a minus terminal of the high-voltage battery 21. In the present embodiment, a circuit for application-voltage decrease, including a capacitor, is incorporated into a feeder circuit from the pre-relay 33 to the inverter 10. According to the present embodiment, the pre-relay 33 is configured to be made ON during a predetermined short period of time before both of the relays 31, 32 are made ON, so that a decreased voltage which is lower than the high voltage of the high-voltage battery 21 can be applied to the inverter 10 for the short time, thereby preventing noises generation or the like which may be caused by quick changing of the voltage. Herein, it is a well known art that the above-described pre-relay 33 is provided, so further explanations are omitted here.

The present invention should not be limited to the above-described embodiment, and any other modifications or improvements may be applied within the scope of a sprit of the present invention. The arrangement positions of the low-voltage battery 11, the high-voltage battery 21, the main relay 30, and the control unit U are optional, including inside or outside of the vehicle compartment. The switch means 41 may be comprised of any other mechanical switch or the like than the semiconductor element. The present invention is aloso applicable to any type of vehicle including a hybrid vehicle as long as the high-voltage battery is provided.

What is claimed is:

1. A harness arrangement structure of a vehicle which is equipped with a motor to drive a driving wheel of the vehicle, a high-voltage battery to supply electricity to the motor for driving the driving wheel of the vehicle, a low-voltage battery, a main relay to be activated by the low-voltage battery for controlling ON or OFF of an electric supply from the high-voltage battery to the motor, wherein the motor is configured to drive the driving wheel of the vehicle when the electric supply from the high-voltage battery is ON, and a control unit to be activated by the low-voltage battery which includes a switch means to open or close of a feeder circuit for the main relay, the harness arrangement structure comprising:

a first harness connecting said small-voltage battery to said main relay; and a second harness connecting said main relay to said control unit, wherein said feeder circuit for the main relay is constituted at least by said first harness, said main relay, said second harness and said switch means which are connected in series from a plus-terminal side of the low-voltage battery to a vehicle-body ground side, and the first harness and the second harness are arranged to be adjacent to each other in a specified range having a specified length so that when the second harness in said specified range is damaged and electrically grounded to a vehicle body, the first harness in said specified range is damaged and electrically grounded to the vehicle body, whereby the electric supply from the high-voltage battery to the motor for driving the driving wheel of the vehicle becomes OFF whenever the second harness gets damaged.

2. The harness arrangement structure of a vehicle of claim 1, wherein said first harness and said second harness are arranged to be adjacent to each other continuously between said main relay and said control unit.

3. The harness arrangement structure of a vehicle of claim 2, wherein said first harness and said second harness are bundled in said specified range.

4. The harness arrangement structure of a vehicle of claim 3, wherein said control unit is arranged in a vehicle compartment, said low-voltage battery is arranged in an engine room, said high-voltage battery and said main relay are arranged below a floor panel constituting a floor face of the vehicle compartment, and said first harness and said second harness are arranged to be adjacent to each other outside the vehicle compartment.

5. The harness arrangement structure of a vehicle of claim 4, wherein said first harness is arranged to extend from said low-voltage battery toward said control unit, penetrating a dash panel partitioning the vehicle compartment from the engine room, then extend from the control unit into the engine room, penetrating the dash panel again, and then extend along the dash panel toward said main relay in the engine room,
said second harness is arranged to extend from the main relay along the dash panel in the engine room, and then extend toward the control unit, penetrating the dash panel, and
the first harness and the second harness are arranged to be adjacent to each other along the dash panel in the engine room.

6. The harness arrangement structure of a vehicle of claim 5, wherein said main relay is arranged at a front end portion of a tunnel portion formed at the floor panel, and a frame member for front suspension is arranged in the engine room at a position which is located in front of the dash panel and near an area where said first harness and said second harness are arranged to be adjacent to each other along the dash panel.

7. The harness arrangement structure of a vehicle of claim 6, wherein said main relay is comprised of plural relays, said switch means is comprised of plural switches, corresponding to said plural relays of the main relay, said first harness is comprised of a single harness and connected in parallel to the plural relays of the main relay, said second harness is comprised of plural harnesses, corresponding to the plural relays of the main relay, and said single harness of the first harness and said plural harnesses of the second harness are arranged to be adjacent to each other.

8. The harness arrangement structure of a vehicle of claim 7, wherein the electricity from the high-voltage battery is supplied from said main relay to said motor via an inverter, said main relay is comprised of three relays in total, which are a relay for plus terminal and a relay for minus terminal to supply a high voltage of the high-voltage battery to said inverter, respectively, and a pre-relay incorporated into a circuit which supplies the high voltage of the high-voltage battery to the inverter in a state in which the voltage is decreased, and said second harness is comprised of three harnesses.

9. The harness arrangement structure of a vehicle of claim 8, wherein said switch means is comprised of an n-type of semiconductor element.

10. The harness arrangement structure of a vehicle of claim 2, wherein said control unit is arranged in a vehicle compartment, said low-voltage battery is arranged in an engine room, said high-voltage battery and said main relay are arranged below a floor panel constituting a floor face of the vehicle compartment, and said first harness and said second harness are arranged to be adjacent to each other outside the vehicle compartment.

11. The harness arrangement structure of a vehicle of claim 1, wherein said first harness and said second harness are bundled in said specified range.

12. The harness arrangement structure of a vehicle of claim 11, wherein said control unit is arranged in a vehicle compartment, said low-voltage battery is arranged in an engine room, said high-voltage battery and said main relay are arranged below a floor panel constituting a floor face of the vehicle compartment, and said first harness and said second harness are arranged to be adjacent to each other outside the vehicle compartment.

13. The harness arrangement structure of a vehicle of claim 1, wherein said control unit is arranged in a vehicle compartment, said low-voltage battery is arranged in an engine room, said high-voltage battery and said main relay are arranged below a floor, panel constituting a floor face of the vehicle compartment, and said first harness and said second harness are arranged to be adjacent to each other outside the vehicle compartment.

14. The harness arrangement structure of a vehicle of claim 1, wherein said main relay is comprised of plural relays, said switch means is comprised of plural switches, corresponding to said plural relays of the main relay, said first harness is comprised of a single harness and connected in parallel to the plural relays of the main relay, said second harness is comprised of plural harnesses, corresponding to the plural relays of the main relay, and said single harness of the first harness and said plural harnesses of the second harness are arranged to be adjacent to each other.

15. A harness arrangement structure of a vehicle, which is equipped with a motor to drive the vehicle, a high-voltage battery to supply electricity to the motor, a low-voltage battery, a main relay to be activated by the low-voltage battery for controlling ON or OFF of an electric supply from the high-voltage battery, and a control unit to be activated by the low-voltage battery which includes a switch means to open or close of a feeder circuit for the main relay, the harness arrangement structure comprising:
a first harness connecting said small-voltage battery to said main relay; and
a second harness connecting said main relay to said control unit,
wherein said feeder circuit for the main relay is constituted at least by said first harness, said main relay, said second harness and said switch means which are connected in series from a plus-terminal side of the low-voltage battery to a vehicle-body ground side, and
the first harness and the second harness are arranged to be adjacent to each other in a specified range having a specified length so that when the second harness in said specified range is damaged and electrically grounded to a vehicle body, the first harness in said specified range is damaged and electrically grounded to the vehicle body,
wherein said first harness and said second harness are arranged to be adjacent to each other continuously between said main relay and said control unit outside the vehicle compartment, and bundled in said specified range, said control unit is arranged in a vehicle compartment, said low-voltage battery is arranged in an engine room, and said high-voltage battery and said main relay are arranged below a floor panel constituting a floor face of the vehicle compartment, and said main relay is comprised of plural relays, said switch means is comprised of plural switches, corresponding to said plural relays of the main relay, said first harness is comprised of a single harness and connected in parallel to the plural relays of the main relay, said second harness is comprised of plural harnesses, corresponding to the plural relays of the main relay, and said single harness of the first harness and said plural harnesses of the second harness are arranged to be adjacent to each other.

16. The harness arrangement structure of a vehicle of claim 15, wherein the electricity from the high-voltage battery is supplied from said main relay to said motor via an inverter, said main relay is comprised of three relays in total, which are a relay for plus terminal and a relay for minus terminal to supply a high voltage of the high-voltage battery to said inverter, respectively, and a pre-relay incorporated into a circuit which supplies the high voltage of the high-voltage battery to the inverter in a state in which the voltage is decreased, and said second harness is comprised of three harnesses.

* * * * *